United States Patent [19]

Takarada et al.

[11] Patent Number: 5,025,049

[45] Date of Patent: Jun. 18, 1991

[54] ALKOXYSILYLATED ACRYLIC OR VINYLIC RESIN CONTAINING PRIMER COMPOSITIONS

[75] Inventors: Mitsuhiro Takarada, Annaka; Kazuharu Sato, Miyogimachi, both of Japan

[73] Assignee: Shin-Etsu Chemical Co., Ltd., Tokyo, Japan

[21] Appl. No.: 530,596

[22] Filed: May 30, 1990

[30] Foreign Application Priority Data

Jun. 2, 1989 [JP] Japan .................................. 1-140725

[51] Int. Cl.$^5$ ........................... C08K 5/47; C08K 5/13; C08K 5/29
[52] U.S. Cl. ..................................... 524/91; 524/205; 524/291; 524/336; 524/337; 524/338; 524/315; 524/361; 524/365; 524/376; 524/588; 525/100; 525/102
[58] Field of Search ............... 524/588, 336, 337, 338, 524/291, 205, 91, 315, 361, 365, 376; 525/100, 102

[56] References Cited

U.S. PATENT DOCUMENTS

| | | | |
|---|---|---|---|
| 4,027,073 | 5/1977 | Clark | 428/412 |
| 4,043,953 | 8/1977 | Chong et al. | 525/100 |
| 4,313,979 | 2/1982 | Frye et al. | 524/337 |
| 4,328,323 | 5/1982 | Keogh | 525/102 |
| 4,334,036 | 6/1982 | Yonezawa et al. | 525/102 |
| 4,439,494 | 3/1984 | Olson | 524/336 |

*Primary Examiner*—Veronica P. Hoke
*Attorney, Agent, or Firm*—Finnegan, Henderson, Farabow, Garrett & Dunner

[57] ABSTRACT

A primer composition dilluted with a suitable organic solvent comprising (A) an organic copolymer comprising an alkoxysilylated monomer, vinyl acetate and other monomers copolymerizable therewith, (B) a polyalkyl (meth)acrylate, (C) a crosslinking agent for said copolymer (A), and (D) an ultraviolet absorber. This primer composition is a very effective primer in forming an organopolysiloxane coating layer excellent in adhesion, endurance, weathering resistance of the surface of a molded article of a thermoplastic resin.

19 Claims, No Drawings

ALKOXYSILYLATED ACRYLIC OR VINYLIC RESIN CONTAINING PRIMER COMPOSITIONS

BACKGROUND OF THE INVENTION

The present invention relates to a primer composition, particularly one to be used for forming an abrasion-resistant organopolysiloxane coating layer excellent in adhesion, endurance, weathering resistance, and so forth on the surface of a molded article of a thermoplastic resin such as polycarbonate.

Although a thermoplastic resin, particularly, polycarbonate is excellent in transparency and impact resistance and is lightweight, so that it has been widely used as a structural material substituting for glass, it has disadvantages in that it is liable to be abraded and attacked by an organic solvent and that it undergoes changes with the lapse of time to cause discoloration and/or deterioration.

Therefore, it has been proposed to coat the surface of a molded article made of a thermoplastic resin with a thermosetting resin, and organopolysiloxane is believed to be particularly useful as such a thermosetting resin, because it can form a coating layer excellent in abrasion resistance and solvent resistance on the molded article. However, the organopolysiloxane coating layer is poor in the adhesion to the surface of a thermoplastic resin such as polycarbonate and in weathering resistance and endurance after being applied to such a surface, so that a process of applying a primer prior to the application of the organopolysiloxane coating has been proposed.

Known such primers include (1) thermoplastic acrylic primer (see Japanese Patent Laid-Open No. 138565/1977), (2) functional group (such as an amino group)-containing acrylic resin primer (see Japanese Patent Laid-Open No. 138476/1978), (3) silicone primer comprising a reaction product of an alkoxysilane having a functional group such as an amino or hydroxyl group with a cyclic acid anhydride (see Japanese Patent Laid-Open No. 81533/1978), (4) silicone primer comprising a mixture of a hydrolyzate of an epoxysilane with an aminosilane (see Japanese Patent Laid-Open No. 63176/1979), (5) acrylic primer comprising a functional group-containing thermoplastic acrylic resin and an ultraviolet absorber (see Japanese Patent Laid-Open No. 500809/1980), (6) acrylic primer comprising a thermosetting acrylic emulsion and an ultraviolet-screening compound (see Japanese Patent Laid-Open No. 160033/1980), (7) silicone primer comprising a reaction product among an aminosilane, an epoxysilane and an acid anhydride (see Japanese Patent Laid-Open No. 16573/1981), (8) thermoplastic acrylic primer comprising a reaction product among an acrylic monomer, an epoxy methacrylate and a hydroxybenzophenone ultraviolet absorber (see Japanese Patent Laid-Open No. 23661/1982), and (9) acrylic primer comprising a thermosetting acrylic resin containing a melamine crosslinking agent and an ultraviolet absorber (see Japanese Patent Laid-Open No. 53701/1985).

However, the application of these primers does not always gives a satisfactory effect. For example, the above primers (1) and (2) are each disadvantageous in that an active hydrogen group (such as an amino group) present therein absorbs moisture to result in lowered adhesion in the presence of moisture and that the weathering resistance can hardly be improved, though the adhesion to a substrate can considerably be improved. The primers (3) and (4) each have defects that the adhesion in the presence of moisture is insufficient owing to the presence of an active hydrogen group therein, that the primers tend to cause yellowing owing to the prsence of an amino group therein, thus rather lowering the weathering resistance in some case, that the hydroxyl and carboxyl groups contained therein easily react with the alkoxy group to cause the primer solution to be thickened with the lapse of time to make its application difficult, and that the degree of polymerization of the primer is increased to result in lowered adhesion though they considerably improve the adhesion to a substrate. The primer (5) is disadvantageous in that the long-term weathering resistance is yet insufficient though the weathering resistance is considerably improved, that when the primer is applied in an increased thickness for the purpose of further improving the weathering resistance, the polyorganopolysiloxane coating layer formed thereon is too soft to exhibit a sufficient abrasion resistance, and that when the amount of the ultraviolet absorber added is increased, the coating layer causes blushing or brings about poor adhesion. The primer (6) has a disadvantage due to its nature of an emulsion in that the usable ultraviolet absorber is limited from the standpoint of water solubility to fail in selectively using a highly effective ultraviolet absorber, and other disadvantages in that the weathering resistance cannot be improved to a satisfactory extent and that the adhesion tends to be rather poor, because the acrylic resin used is thermosetting. The primer (7) has defects similar to those of the primers (3) and (4). The primer (8) has defects that the preparation of an acrylic polymer containing a large amount of an ultraviolet absorber is difficult because of the radical stabilizing action of the ultraviolet absorber, so that it cannot sufficiently improve the weathering resistance and the adhesion. Further, the primer (9) has a defect that the adhesion cannot be sufficiently improved though the weathering resistance can be improved.

Accordingly, a principal object of the present invention is to provide a primer composition for forming an organopolysiloxane coating layer on a molded article made of a thermoplastic resin such as polycarbonate, which is free from the defects of the primers according to the prior art references, i.e., a primer composition which does not undergo any change with the lapse of time and permits the formation of an organopolysiloxane coating layer improved in adhesion and resistances to heat, hot water and weather.

SUMMARY OF THE INVENTION

For the purpose of overcoming the above disadvantages of the primers according to the prior art references to thereby give an improved primer composition for use in forming an organopolysiloxane coating layer on a molded article made of a thermoplastic resin, the inventors of the present invention have conducted extensive studies and have found that a primer composition dilluted with an organic solvent which comprises (A) an organic copolymer comprising an alkoxysilylated monomer, vinyl acetate and other monomers copolymerizable therewith, (B) a polyalkyl (meth)acrylate, (C) a crosslinking agent for said copolymer (A), and (D) an ultraviolet absorber does not undergo any change with the lapse of time and can effectively improve the adhesion of the organopolysiloxane coating layer to the article and the weathering resistance of the organopolysiloxane coating layer, and that a molded article made of a thermoplastic resin such as polycarbonate can be effectively improved in weathering resistance and adhesion to cause no yellowing, by applying the above primer composition to the article, curing the composition to form a primer layer, and forming an abrasion-resistant coating layer made of a composition comprising an organopolysiloxane and a particulate inorganic material on the primer layer. The inventors of the present invention have further made studies on the kinds and proportions of the components and have accomplished the present invention.

Namely, the present invention relates to a primer composition free from the defects of the primers according to the prior art references, which dilluted with an organic solvent and which comprises (A) 100 parts by weight of an organic copolymer comprising an alkoxysilylated acrylic and/or vinylic monomer, vinyl acetate and other monomers copolymerizable therewith, (B) 10 to 100 parts by weight (both exclusive) of a polymer or copolymer comprising one or more monomers selected from the group consisting of alkyl acrylates and alkyl methacrylates, each alkyl group having 1 to 8 carbon atoms, (C) 20 to 100 parts by weight (both exclusive) of a crosslinking agent for said organic copolymer (A), and (D) 10 to 100 parts by weight (both exclusive) of an ultraviolet absorber.

The primer composition of the present invention can be prepared by mixing the above components (A) to (D) together each in a specified amount, and then dilluting with a suitable organic solvent.

DETAILED DESCRIPTION OF THE PREFERRED EMBODIMENT

The organic copolymer (A) constituting the primer composition of the present invention is a copolymer comprising an alkoxysilylated acrylic and/or vinylic monomer, vinyl acetate and other monomers copolymerizable therewith. The copolymer (A) is reactive with an organopolysiloxane coating layer by virture of the alkoxysilyl group introduced thereinto, by which the adhesion of the organopolysiloxane layer can be enhanced. Further, the primer of the present invention can be thermally set by the crosslinking of the alkoxysilyl groups with each other, thus being excellent in heat resistance and endurance. The content of the alkoxysilylated monomer in the copolymer is preferably 2 to 50% by weight (both exclusive). If the content is 2% by weight or below, the resulting primer is not thermosetting to give poor heat resistance and endurance, while if it is 50% by weight or above, the resulting primer is so hard as to give lowered adhesion.

The alkoxysilylated acrylic monomer is represented by the general formula:

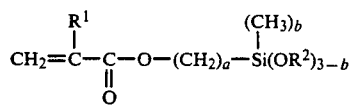

wherein $R^1$ is a hydrogen atom or a methyl group; $R^2$ is a $C_{1\sim 6}$ monovalent hydrocarbon group selected from the group consisting of alkyl groups such as methyl, ethyl and propyl groups; alkenyl groups such as vinyl, isopropenyl and allyl groups; and aryl groups such as a phenyl group; a is 1 to 3 and b is 0 or 1.

Examples of the acrylic monomer include 3-methacryloxypropyltrimethoxysilane, 3-methacryloxy propyltriethoxysilane, 3-methacryloxypropyltributoxy silane, 3-methacryloxypropyltriisopropenoxysilane, methacryloxymethyltrimethoxysilane, methacryloxymethyltriethoxysilane, methacryloxymethyltributoxysilane, 3-acryloxypropyltrimethoxysilane, 3-acryloxypropyltriethoxysilane, 3-acryloxypropyltributoxysilane, acryloxymethyltrimethoxysilane, acryloxymethyltriethoxysilane, acryloxymethyltributoxysilane, 3-methacryloxypropylmethyldimethoxysilane, 3-methacryloxypropylmethyldiethoxysilane, 3-methacryloxypropylmethyldibutoxysilane, methacryloxymethylmethyldimethoxysilane, methacryloxymethylmethyldiethoxysilane methacryloxymethylmethyldibutoxysilane, 3-acryloxypropylmethyldimethoxysilane, 3-acryloxypropylmethyldiethoxysilane, 3-acryloxypropylmethyldibutoxysilane, acryloxymethylmethyldimethoxysilane, acryloxymethylmethyldiethoxysilane and acryloxymethylmethyldibutoxysilane, among which 3-methacryloxypropyltrimethoxysilane and 3-methacryloxypropylmethyldimethoxysilane are preferred in respects of handleability, crosslinking density, reactivity, and so forth.

The alkoxysilylated vinylic monomer is a vinyl-functional alkoxysilane represented by the general formula:

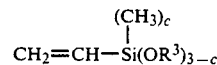

wherein $R^3$ is a $C_{1\sim 6}$ monovalent hydrocarbon group selected from the group consisting of those listed above with respect to $R^2$ or an alkyloxyalkyl group; and c is 0 or 1, or by the general formula:

wherein $R^3$ is as defined above and d is 0 or 1.

Examples of the vinyl monomer include vinyltrimethoxysilane, vinyltriethoxysilane, vinyltributoxysilane, vinyltris(2-methoxyethosy)silane, vinylmethyldimethoxysilane, vinylmethyldiethoxysilane, vinylmethyldibutoxysilane, vinylmethylenebis(2-methoxyethoxy)silane, 3-vinyloxypropyltrimethoxysilane, 3-vinyloxypropyltriethoxysilane 3-vinyloxypropylmethyldimethoxysilane. 3-vinyloxypropylmethyldiethoxysilane and 3-vinyloxypropylmethyldibutoxysilane, among which vinyltrimethoxysilane, vinyltriethoxysilane and 3-vinyloxypropyltrimethoxysilane are preferred in respects of handleability and reactivity.

Further, the copolymer (A) must contain vinyl acetate as an essential monomer to enhance the adhesion to polycarbonate. It is preferable that the vinyl acetate content of the copolymer (A) be 2 to 40% by weight (both exclusive). If the content is 2% by weight or below, the adhesion to polycarbonate is not improved, while if the content is 40% by weight or above, the resulting primer exhibits an enhanced thermoplastic property, so that the heat resistance and endurance thereof is not improved.

The copolymer (A) must further contain the monomers copolymerizable with the above alkoxysilylated acrylic and/or vinylic monomer. Examples of the copolymerizable monomers include a glycidylic monomer, an alkyl acrylate, or alkyl methacrylate.

It is preferable that the content of the copolymerizable monomers in the copolymer (A) be 10 to 96% by weight (both inclusive). The glycidylic monomer is effective in improving the adhesion of the organopolysiloxane layer to the plastic substrate, and it is preferable that the content of the glycidylic monomer in the copolymer (A) be 2 to 40% by weight (both inclusive). Examples of the glycidylic monomer include glycidyl acrylate, glycidyl methacrylate and allyl glycidyl ether, and among which glycidyl methacrylate is most preferable. The alkyl (meth)acrylate is used to form the skelton of an alkyl resin in the copolymer (A), and it is preferable that the alkyl (meth)acrylate content be 8 to 94% by weight (both inclusive). Examples of the alkyl (meth)acrylates include alkyl acrylates and alkyl methacrylates, each alkyl group having 1 to 8 carbon atoms. Examples thereof include methyl acrylate, methyl methacrylate, ethyl acrylate, ethyl methacrylate, butyl acrylate, butyl methacrylate, 2-ethylhexyl acrylate and 2-ethylhexyl methacrylate, and methyl methacrylate is most preferable. The copolymerizable monomers further include acrylamide, acrylonitrile, ethyl vinyl ether, butyl vinyl ether, hexyl vinyl ether, styrene, ethylene glycol dimethacrylate or the like. However, if a monomer reactive with an alkoxysilyl group, such as 2-hydroxyethyl methacrylate, 2-hydroxypropyl methacrylate or N-methylolacrylamide is used, the resulting primer tends to cause thickening or gelation with the lapse of time. Accordingly, the use of such a monomer is unfavorable.

The organic copolymer (A) can be easily prepared by adding a radical polymerization catalyst selected from the group consisting of peroxides such as dicumyl peroxide and benzoyl peroxide and azo compounds such as azobisisobutyronitrile to a solution containing an alkoxysilylated acrylic and/or vinylic monomer, vinyl acetate, glycidyl (meth)acrylate, alkyl (meth)acrylate and so on and heating the obtained mixture to carry out a reaction. The copolymer (A) serves to immobilize the components (D) by the reaction with the component (C) which will be described below.

The polyalkyl (meth)acrylate (B) constituting the primer composition of the present invention serves to thicken the primer solution without lowering the adhesion and is essential for controlling the coating thickness of the primer. Further, the polyalkyl (meth)acrylate (B) serves to accelerate the anchoring effect of the primer composition on a plastic substrate and examples thereof include polymers and copolymers comprising one or more monomers selected from the group consisting of alkyl acrylates and alkyl methacrylates, each alkyl group having 1 to 8 carbon atoms. Examples of the alkyl acrylates and alkyl methacrylates include methyl acrylate, methyl methacrylate, ethyl acrylate, ethyl methacrylate, butyl acrylate and butyl methacrylate. The amount of the component (B) to be added must be 10 to 100 parts by weight (both exclusive) per 100 parts by weight of the component (A). If the amount is 10 parts by weight or below, the coating thickness of the resulting primer is so small that the absolute content of the ultraviolet absorber is lowered to give poor weathering resistance, while if it is 100 parts by weight or above, the viscosity of the resulting primer composition is so high that the workability of the composition is poor and the resistance of the coating layer to heat or thermal shock will be lowered.

The crosslinking agent (C) constituting the primer composition of the present invention serves to crosslink the above component (A), so that the crosslinking agent (C) is not particularly limited but may be any one as far as it can crosslink the component (A). Preferred examples of the crosslinking agent (C) include amidation products of adducts of an amino-functional alkoxysilane with an epoxy-functional alkoxysilane, amidation products of partially silylated adducts of an amino-functional alkoxysilane with an epoxy-functional alkoxysilane, adducts of an amino-functional alkoxsilane with an acid anhydride, amino-functional alkoxysilanes and hydrolyzates thereof. The primer composition of the present invention contains a relatively large amount of the ultraviolet absorber (D) which will be described below in order to enhance the weathering resistance thereof. In order to immobilize the ultraviolet absorber (D) in the primer composition effectively, it is preferable to use an amidation product of a reaction product of an amino-functional alkoxysilane with an epoxy-functional alkoxysilane and a silylating agent. The use of such an amidation product serves to impart excellent water resistance and high adhesion to the primer and the amidation product can immobilize a large amount of an ultraviolet absorber in the primer resin without lowering the adhesion.

The amino-functional alkoxysilane to be used in the preparation of the above crosslinking agent (C) includes N-(2-aminoethyl)-3-aminopropyltrimethoxysilane, N-(2-aminoethyl)-3-aminopropyltriethoxysilane, N-(2-aminoethyl)-3-aminopropylmethyldiethoxysilane, 3-aminopropylmethyldimethoxysilane, 3-aminopropyltriethoxysilane, N-(4-aminobutyl)-3-aminopropyltrimethoxysilane, N-(4-aminobutyl)-aminopropylmethyldimethoxysilane, N-(6-aminohexyl)-3-aminopropyltrimethoxysilane, N-(6-aminohexyl)-3-aminopropylmethyldimethoxysilane, N-(2-aminoethyl)aminomethylstyryltrimethoxysilane and N-(2-aminoethyl)aminomethylstyrylmethyldimethoxysilane. among which N-(2-aminoethyl)-3-aminopropyltrimethoxysilane and N-(2-aminoethyl)-3-aminopropylmethyldimethoxysilane are preferable in respects of adhesion and workability.

The epoxy-functional alkoxysilane to be used herein includes 3-glycidoxypropyltrimethoxysilane, 3-glycidoxypropylmethyldimethoxysilane, 3-glycidoxypropyltriethoxysilane, 3-glycidoxypropylmethyldiethoxysilane, 2-(3,4-epoxycyclohexyl)ethyltrimethoxysilane, 5,6-epoxyhexyltrimethoxysilane, 5,6-epoxyhexylmethyldimethoxysilane, 7,8-epoxyoctyltrimethoxysilane and 9,10-epoxydecyltrimethoxysilane, among which 3-glycidoxypropyltrimethoxysilane, 3-glycidoxypropylmethyldiethoxysilane and 2-(3,4-epoxycyclohexyl)ethyldiethoxysilane are prefeable in respects of reactivity and workability.

The silylating agent to be used herein includes hexamethyldisilazane, N,N-bis(trimethylsilyl)formamide and N,N'-bis(trimethylsilyl)urea. The silylating agent serves to protect the hydroxyl group formed by the reaction of an amino-functional alkoxysilane with an epoxy-functional alkoxysilyl group to thereby prevent the reaction of the hydroxyl group with the alkoxysilyl group, thus preventing the change of the reaction product with the time.

The reaction of an amino-functional alkoxysilane with an epoxy-functional alkoxysilane and a silylating agent may be carried out by dropwise adding an epoxy-functional alkoxysilane to a mixture comprising an amino-functional alkoxysilane and a silylating agent to carry out a reaction under heating. Alternatively, the reaction may be carried out by reacting an amino-functional alkoxysilane with an epoxy-functional alkoxysilane and adding a silylating agent to the reaction product to carry out a reaction. In the reaction, the amino-functional and epoxy functional alkoxysilanes are preferably used at a molar ratio of the epoxy group to the amino group of 0.3 to 1.2 (both exclusive). If the molar ratio is 0.3 or below, the number of alkoxy groups contributory to the crosslinking per molecule is small to give a poor curing power and the resulting molecule does not spread sufficiently to give poor surface adhesion. On the contrary, if the molar ratio is 1.2 or above, the obtained product scarcely contains an =N-H group which can be amidated in the subsequent step to give a primer poor in adhesion in the presence of moisture.

The compound to be particularly preferably used as the component (C) according to the present invention is one prepared by the amidation of a reaction product as prepared above. Such a compound can be prepared by reacting a reaction product as prepared above with a halide, anhydride or isopropenyl ester of a carboxylic acid, such as acetyl chloride, acetyl bromide, propinyl chloride, butyryl chloride, acetic anhydride, isopropenyl acetate or benzoyl chloride.

The amount of the component (C) to be used must be 20 to 100 parts by weight (both exclusive) per 100 parts by weight of the component (A). If the amount is 20 parts by weight or below, the resulting primer will exhibit poor adhesion to a substrate, while if it is 100 parts by weight or above, the resulting primer layer has such a high crosslinking density as to bring about too high hardness, thus resulting in poor adhesion.

The ultraviolet absorber (D) constituting the primer composition of the present invention is an essential component for protecting the primer layer and the plastic substrate from light and may be selected from among conventional salicylic acid, benzophenone, benzotriazole and cyanoacrylate ultraviolet absorbers. The amount of the ultraviolet absorber (D) to be used must be 10 to 100 parts by weight (both exclusive) per 100 parts by weight of the above component (A). If the amount is 10 parts by weight or below, no weathering resistance improving effect will be attained, while if it is 100 parts by weight or above, such a large amount of an ultraviolet absorber cannot be incorporated into a mixture comprising the above components (A) to (C) in a well-compatible state to give an opaque primer coating layer.

Particular examples of the ultraviolet absorber include 2,4-dihydroxybenzophenone, 2-hydroxy-4-n-octoxybenzophenone, 2-hydroxy-4-methoxybenzophenone, 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydrdoxy-4,4'-dibutoxybenzophenone, 2-(2'-hydroxy-5'-methylphenyl)benzotriazole, 2-(2'-hydroxy-5'-t-butylphenyl)benzotriazole, 2-(2'-hydroxy-3',5'-di-t-amylphenyl)benzotriazole. 2-(2'-hydroxy-3',5'-di-t-butylphenyl)benzotriazole. 2-(2'-hydroxy-3'-methyl-5'-t-butylphenyl)benzotriazole. 2-(2'-hydroxy-5'-cyclohexylphenyl)benzotriazole, 2-(2'-hydroxy-3',5'-dimethylphenyl)benzotriazole, ethyl 3,3-diphenyl-2-cyanoacrylate and octyl 3,3-diphenyl-2-cyanoacrylate. Further, an antioxidant based on phenols, phosphates or hindered amines may be arbitrarily added to the primer composition of the present invention.

The composition used in the primer composition of the present invention can be prepared by mixing the components (A) to (D) together each in a specified amount and dilluting with a suitable organic solvent. The treatment of a plastic substrate with the primer composition of the present invention may be carried out by applying it to the surface of the plastic substrate (such as film or plate) which has been preliminarily conditioned and evaporatinq off the solvent at a room or elevated temperature to form a coating layer having a thickness of 1 to 10 μm, preferably 2 to 5 μm. The suitable solvent to be used to dillute the composition to get the primer composition of the present invention include alcohols such as methanol, ethanol, isopropanol, isobutanol, methoxyethanol, ethoxyethanol, butoxyethanol and diacetone alcohol; ketones such as methyl ethyl ketone and methyl isobutyl ketone; esters such as ethyl acetate and isobutyl acetate; aromatic compounds such as toluene and xylene; and mixtures thereof. The viscosity of the dilluted primer composition is preferably 5 to 30 cSt (both exclusive). If the viscosity is 5 cSt or below, no thick coating layer can be prepared, while if it is 30 cSt or above, the handling and application of the resulting primer composition is difficult. Further, a fluorocarbon or silicone surfactant may be optionally added to the solution for the purpose of leveling the coating layer. Furthermore, a curing catalyst may be optionally added to the solution for the purpose of accelerating the curing of the coating layer, and examples thereof include alkyl titanate, alkyl titanate homopolymer, aluminum alkoxide, aluminum chelate, dibutyltin dioctate and dibutyltin dilaurate.

The plastic molded article (such as film or plate) thus treated with the primer composition of the present invention is excellent in initial adhesion and resistance to heat, hot water and weather. An organopolysiloxane composition containing one or more of conventional particulate inorganic materials selected from among colloidal silica, colloidal titania, colloidal alumina and so on may be applied on the primer layer of the article and cured at 50° to 140° C. to form an abrasion-resistant coating layer thereon. The above organopolysiloxane composition may be prepared by, for example, adding 5 to 70% by weight (both inclusive) of a dispersion of a colloidal particulate inorganic material having a mean particle diameter of 1 to 100 μm in water or an alcohol such as methanol, ethanol, isobutanol or diacetone alcohol to a hydrolyzate or cohydrolyzate of one or more alkoxysilanes represented by the general formula:

wherein $R^5$ is a monovalent hydrocarbon group having 1 to 6 carbon atoms; $R^6$ is a monovalent hydrocarbon group having 1 to 6 carbon atoms or an alkyloxyalkyl group; and m is 0,1 or 2. Particular examples of the above alkoxysilane include methyltrimethoxysilane, methyltriethoxysilane, methyltributoxysilane, methyltris(2-methoxyethoxy)silane, ethyltrimethoxysilane ethyltriethoxysilane, vinylmethoxysilane, vinyltriethoxysilane, vinyltris(2-methoxyethoxy)silane, phenyltrimethoxysilane, phenyltriethoxysilane, dimethyldimethoxysilane, dimethyldiethoxysilane, diphenyldimethoxysilane, diphenyldiethoxysilane, tetramethoxysilane, tetraethoxysilane, tetrabutoxysilane and tetrakis(2-methoxyethoxy)silane. The plastic article thus obtained has an advantage in that it is excellent in adhesion, endurance and abrasion resistance by virtue of the synergistic action of the primer coating and the organopolysiloxne. Particularly, when an organopolysiloxane composition prepared by using a dispersion of colloidal silica in water or alcohol is used, the adhesion is further improved.

The present invention will now be illustrated in more detail by reference to the following. Examples, but they are illustrative only and should not be construed as limiting the present invention which is properly delineated in the appended claims. All parts and percentages are by weight. The performances of the coating layers prepared in the Examples were evaluated as follows:

Abrasion resistance

Each sample was abraded with a Taber abrader under a load of 500 g by the use of an abrasive paper CS-10 to determine the haze (%) after 100 rotations with a haze meter. A case wherein the haze was 5% or below is is shown by "good".

Adhesion

The surface of each sample was cut in the grid form (10×10, interval: 1 mm) and subjected to the peeling test with an adhesive tape to determine the number of squares in which the coating layer remained (a case wherein the coating layer completely adhered to the substrate is shown by 100/100).

Heat resistance

Determined by placing each sample in an atmosphere at 100° C. for 100 hours and observing the appearance of the coating layer with the naked eyes.

Boiling water resistance

Determined by immersing each sample in boiling water at 100° C. for 2 hours and observing the appearance of the coating layer with the naked eyes. The resulting sample was also subjected to the above adhesion test.

Weathering resistance

Determined by exposing each sample to Sunshine weatherometer for 3000 hours and observing the appearance of the resulting coating layer with the naked eyes. The resulting sample was also subjected to the above adhesion test.

PREPARATION 1

Synthesis of the component (A)

0.5 part of azobisisobutyronitrile was dissolved in 100 parts of each of five mixtures prepared by mixing 3-methacryloxypropyltrimethoxysilane, vinyl acetate, glycidyl methacrylate, methyl methacrylate and ethyl acrylate together each in an amount specified in Table 1 to give solutions. Each of the solutions was dropwise added to 100 parts of diacetone alcohol at 80° to 90° C. in a stream of nitrogen over a period of 5 hours. Thus, synthetic fluids I to V each containing the alkoxysilylated polymer (polymer content: 50%) were prepared.

TABLE 1

| Components | Synthetic Example | | Comparative Synthetic Example | | |
|---|---|---|---|---|---|
| | 1 | 2 | 1 | 2 | 3 |
| 3-methacryloxypropyltrimethoxysilane | 20 | 20 | 20 | 20 | 20 |
| vinyl acetate | 10 | 5 | — | 10 | — |
| glycidyl methacrylate | 10 | 5 | — | — | 10 |
| methyl methacrylate | 50 | 60 | 60 | 60 | 60 |
| ethyl acrylate | 10 | 10 | 20 | 10 | 10 |

TABLE 1-continued

| Components | Synthetic Example | | Comparative Synthetic Example | | |
|---|---|---|---|---|---|
| | 1 | 2 | 1 | 2 | 3 |
| synthetic fluid No. | I | II | III | IV | V |

PREPARATION 2

Synthesis of the component (C)

222 g of 3-(2'-aminoethyl)aminopropyltrimethoxysilane and 242 g of hexamethyldisilazane were fed into a 2-l separable flask. 496 g of 3-glycidoxypropylmethyldiethoxysilane was dropwise added into the flask at 120° C. in a stream of nitrogen. The resulting mixture was stirred under heating at 120° C. for 5 hours to give a silylated adduct of the aminosilane with the epoxysilane.

The obtained reaction product was treated in a vacuum of 30 to 50 mmHg at 100° C. to give 862 g of a viscous compound, to which was added 862 g of toluene. 141 g of acetic anhydride was dropwise added to the obtained mixture in a stream of nitrogen at a room temperature. The resulting mixture was stirred under heating at 110° C. for 2 hours, followed by the dropwise addition thereto of 141 g of methanol at 50° C. The resulting mixture was stirred under heating at 50° C. for one hour and distilled at 100° C. under a reduced pressure of 30 to 50 mmHg to remove low-boiling fractions. Thus, an amidation product was obtained This product was diluted with ethyl Cellosolve to prepare a solution of the component (C) (active ingredient content: 25%).

PREPARATION 3

Preparation of a colloidal silica-containing organopolysiloxane composition 164 g of methyltriethoxysilane and 46 g of isobutanol were fed into a 1-l separable flask. 138 g of colloidal silica, Snowtex-O [trade name of Nissan Chemical Industsries, Ltd., $SiO_2$ content: 20%] was added into the flask, while stirring under ice-cooling at 5° C. or below. The contents were stirred at 5° C. or below for 2 hours and at 20° to 25° C. for 8 hours, followed by the addition thereto of 36 g of ethyl Cellosolve, 1.8 g of 2,4-dihydroxybenzophenone, 0.1 g of polyether-modified silicone, KP-341 [trade name of Shin-Etsu Chemical Co., Ltd.] and 0.15 g of potassium propionate. Thus, a colloidal silica-containing organopolysiloxane composition was prepared.

EXAMPLE 1

8.0 parts of the solution of the component (A) prepared above (synthetic fluid I), 2.0 parts of polymethyl methacrylate having an average molecular weight of 150,000 as the component (B), 10 parts of the solution of the component (C) prepared above, 1.5 parts of 2-(2'hydroxy-5'-t-butylphenyl)-benzotriazole as the component (D), 70 parts of ethyl Cellosolve and 8.5 parts of diacetone alcohol were mixed together to give a primer composition. This composition was applied to a polycarbonate plate by dipping and heating at 80° C. for 10 minutes. The colloidal silica-containing organopolysiloxane composition prepared above was applied thereon by dipping, air-dried and cured at 120° C. for 2 hours to prepare a test piece. This test piece was examined for various performances. The obtained results are given in Table 2.

EXAMPLE 2 AND COMPARATIVE EXAMPLES 1 TO 3

The same procedure as that of Example 1 was repeated except that the synthetic fluid I as the component (A) was replaced by synthetic fluid II (Example 2), III (Comparative Example 1) IV (Comparative Example 2) or V (Comparative Example 3). Thus, four test pieces were prepared and examined for performances. The obtained results are given in Table 2.

TABLE 2

| Item | Example No. | | | | |
|---|---|---|---|---|---|
| | Example | | Comparative Example | | |
| | 1 | 2 | 1 | 2 | 3 |
| Component (A) solution No. | I | II | III | IV | V |
| Appearance | normal | normal | slight blushing | normal | normal |
| Abrasion resistance | good | good | no good | good | good |
| Adhesion | 100/100 | 100/100 | 100/100 | 100/100 | 100/100 |
| Heat resistance | normal | normal | micro-cracking | normal | micro-cracking |
| Boiling water resistance | | | | | |
| appearance | normal | normal | blushing | blushing | blushing |
| adhesion | 100/100 | 100/100 | 50/100 | 90/100 | 90/100 |
| Weathering resistance | | | | | |
| appearance | slightly yellowing | slightly yellowing | peeling | cracking | peeling |
| adhesion | 100/100 | 100/100 | 0/100 | 30/100 | 0/100 |

What is claimed is:

1. A primer composition dilluted with an organic solvent comprising:
   (A) 100 parts by weight of an organic copolymer comprising an alkoxysilylated acrylic and/or vinylic monomer, vinyl acetate and other monomers copolymerizable therewith;
   (B) 10 to 100 parts by weight (both exclusive) of a polymer or copolymer comprising one or more monomers selected from the group consisting of alkyl acrylates and alkyl methacrylates, each alkyl group having 1 to 8 carbon atoms;
   (C) 20 to 100 parts by weight (both exclusive) of a crosslinking agent for said organic copolymer (A); and
   (D) 10 to 100 parts by weight (both exclusive) of an ultraviolet absorber.

2. The primer composition of claim 1, wherein the alkoxysilylated monomer content in the organic copolymer (A) is 2 to 50% by weight (both exclusive).

3. The primer composition of claim 1, wherein the acrylic monomer of the organic copolymer (A) is a monomer represented by the general formula:

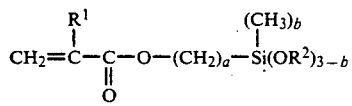

wherein $R^1$ is a hydrogen atom or a methyl group; $R^2$ is a $C_{1\sim 6}$ monovalent hydrocarbon group selected from the group consisting of alkyl groups; alkenyl groups; and aryl groups; a is 1 to 3 and b is 0 or 1.

4. The primer composition of claim 3, wherein the acrylic monomer is 3-methacryloxypropyltrimethoxysilane or 3-methacryloxypropylmethyldimethoxsilane.

5. The primer composition of claim 1, wherein the vinylic monomer of the organic copolymer (A) is a vinyl-functional alkoxysilane represented by the general formula:

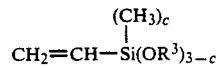

wherein $R^3$ is an alkyloxyalkyl group or a $C_{1\sim 6}$ monovalent hydrocarbon group selected from the group consisting of alkyl groups; alkenyl groups; and aryl groups; and c is 0 or 1, or
by the general formula:

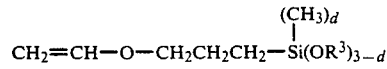

wherein $R^3$ is as defined above and d is 0 or 1.

6. The primer composition of claim 5, wherein the vinyl-functional alkoxysilane is vinyltrimethoxysilane, vinyltriethoxysilane, or 3-vinyloxypropyltrimethoxysilane.

7. The primer composition of claim 1, wherein the vinyl acetate content in the organic copolymer (A) is 2 to 40% by weight (both exclusive).

8. The primer composition of claim 1, wherein the other monomers in the organic copolymer (A) are a glycidylic monomer and alkyl (meth)acrylate.

9. The primer composition of claim 8, wherein the glycidylic monomer is glycidyl methacrylate.

10. The primer composition of claim 8, wherein the alkyl (meth)acrylate is an alkyl acrylate or alkyl methacrylate, each alkyl group having 1 to 8 carbon atoms.

11. The primer composition of claim 8, wherein the alkyl (meth)acrylate is methyl methacrylate.

12. The primer composition of claim 8, wherein the other monomers content in the organic copolymer (A) is 10 to 96% by weight (both inclusive).

13. The primer composition of claim 8 or 9, wherein the glycidylic monomer content in the organic copolymer (A) is 2 to 40% by weight (both inclusive).

14. The primer composition of claim 8, 10, or 11, wherein the alkyl (meth)acrylate content in the organic copolymer (A) is 8 to 94% by weight (both inclusive).

15. The primer composition of claim 1, wherein the crosslinking agent (c) is a compound selected from the group consisting of amidation products of adducts of an amino-functional alkoxysilane with an epoxy-functional alkoxysilane, amidation products of partially silylated adducts of an amino-functional alkoxysilane with an epoxy-functional alkoxysilane, adducts of an amino-functional alkoxysilane with an acid anhydride, amino-functional alkoxysilanes and hydrolyzates thereof.

16. The primer composition of claim 15, wherein the crosslinking agent (c) is an amidation product of a partially silylated adduct of an amino-functional alkoxysilane with an epoxy-functional alkoxysilane.

17. The primer composition of claim 16, wherein the amino-functional alkoxysilane is N-(2-aminoethyl)-3-aminopropyltrimethoxysilane or N-(2-aminoethyl)-3-aminopropylmethyldimethoxysilane.

18. The primer composition of claim 16, wherein the epoxy-funcitonal alkoxysilane is 3-glycidoxypropyltrimethoxysilane, 3-glycidoxypropylmethyldiethoxysilane, or 2-(3,4-epoxycyclohexyl)ethyldiethoxysilane.

19. The primer composition of claim 1 having a viscosity of 5 to 30 cSt (both exclusive).

* * * * *